United States Patent [19]

Wehr

[11] 4,300,976
[45] Nov. 17, 1981

[54] APPARATUS FOR THE WELDING OF STRIPS OF THERMOPLASTIC MATERIAL LYING ON TOP OF EACH OTHER

[75] Inventor: Hubert Wehr, Bornheim-Brenig, Fed. Rep. of Germany

[73] Assignee: Cyjkio-Gesellschaft Emil Hoffmann, Cologne, Fed. Rep. of Germany

[21] Appl. No.: 174,834

[22] Filed: Aug. 4, 1980

[30] Foreign Application Priority Data

Aug. 17, 1979 [DE] Fed. Rep. of Germany ....... 2933302

[51] Int. Cl.³ .............................................. B29C 27/08
[52] U.S. Cl. ................................. 156/502; 100/33 PB; 156/73.5; 156/580
[58] Field of Search ...................... 156/157, 73.5, 502, 156/580; 100/33 PB; 228/112, 2

[56] References Cited

U.S. PATENT DOCUMENTS

| | | | |
|---|---|---|---|
| 3,442,732 | 5/1969 | Stensaker et al. | 100/33 PB |
| 3,494,280 | 2/1970 | Kobiella | 156/73.5 |
| 3,554,845 | 1/1971 | Billett et al. | 156/73.5 |
| 3,648,739 | 3/1972 | Angarola | 100/33 PB |
| 4,119,449 | 10/1978 | Gould et al. | 100/33 PB |
| 4,227,949 | 10/1980 | Wehr | 156/73.5 |

*Primary Examiner*—Michael G. Wityshyn
*Attorney, Agent, or Firm*—Meyer, Tilberry & Body

[57] ABSTRACT

Apparatus for the welding of strips of thermoplastic material lying on top of each other which enables varying of the welding area and wherein the contact area between the jaws and the strip is larger than the welding area. One jaw is fixed and the other jaw is swingable about a vertical axis through the strip while in pressure engagement with the ends of the strips to be welded.

9 Claims, 4 Drawing Figures

U.S. Patent    Nov. 17, 1981    4,300,976
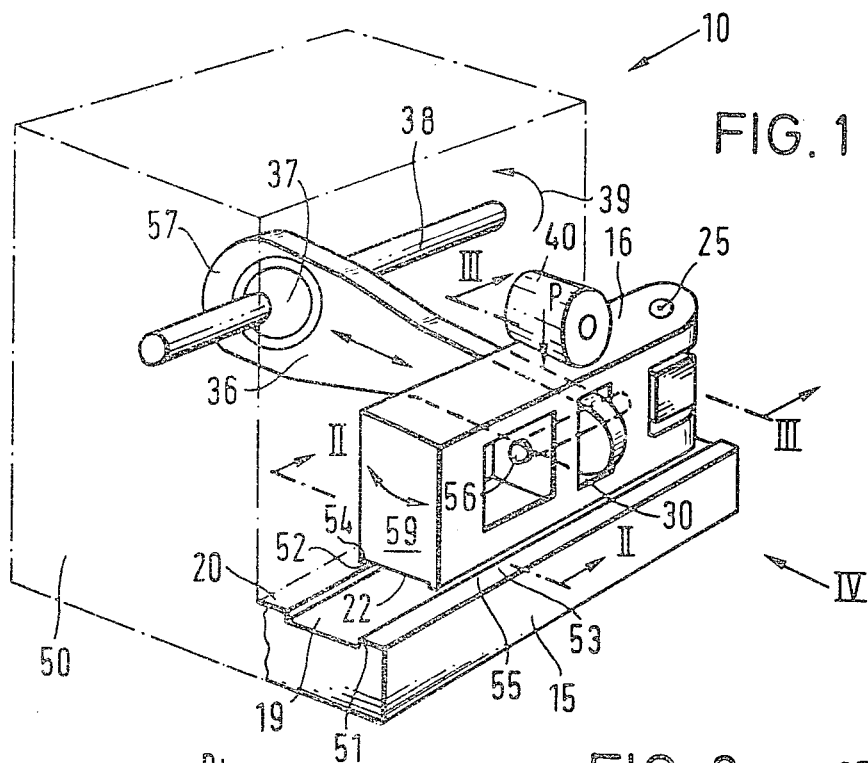
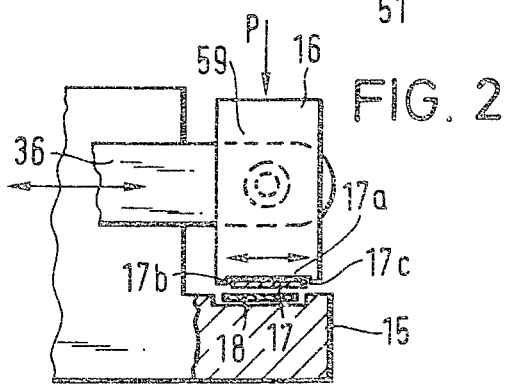
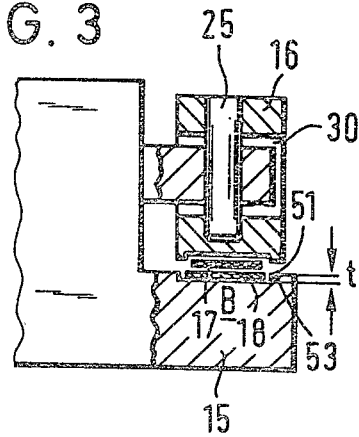
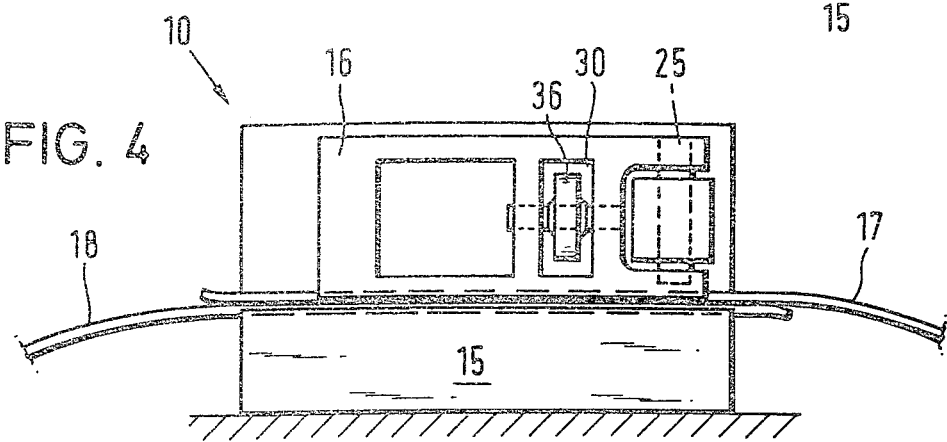

APPARATUS FOR THE WELDING OF STRIPS OF THERMOPLASTIC MATERIAL LYING ON TOP OF EACH OTHER

The invention is concerned with an apparatus for the welding of strips of thermoplastic material lying on top of each other by pressure and frictional heat, with stationary and with movable friction jaws extending in the longitudinal direction of the strips which jaws are under pressure and perform swinging motions around axes perpendicular to the strip surfaces. Such a device is known from the German Pat. No. 28 02 034. It is the task of the invention to develop an apparatus of this kind in such a way that it is possible to vary the welding area and to adapt it in its length to the strip dimension and to the frictional heat to be generated, which is different for different strip materials.

This problem is solved with the invention in that only one movable friction jaw is provided which holds the strip end and is swingable together with it and whose contact area on this one strip end is larger than the welded area.

This construction offers the advantage that the upper, moved strip end is not engaged as highly as in the rocking motion of two movable jaw parts which carry out unidirectional swinging movements. Since in case of the rocking jaw part the motion toward the swivel axis becomes smaller and smaller and dwindles to zero, the frictional heat is also with only one swiveling friction jaw nonuniformly distributed over the length of the welding area so that a weakening of the strip at the end of the welding zone does not occur. Since there exists only one friction jaw, the upper strip end can be pushed more or less far under the movable friction jaw. It is hereby possible to adapt the length of the welding area to the dimensions and the material properties of the specific strip to be processed and to the tractive force to be transmitted. To this end the friction jaws can have on their surfaces facing each other recesses adjustable in their width. The width of the recesses in the friction jaws can be made adjustable by taper gibs which form a lateral rim and are lockable in the recess in various positions. For this purpose indentations on the side walls of the recess or pins in its base can be arranged.

OBJECTS

The principal object of the invention is the provision of a new and improved apparatus for the welding of strips of thermoplastic material lying on top of each other wherein the area of contact of the jaws with the strips is greater than the ultimate welded area.

Another object of the invention is the provision of a new and improved apparatus of the type described wherein the zone of intimate fusion of the two strip ends blends gradually over into that zone where the strips lie on top of each other without fusion.

Another object of the invention is the provision of a new and improved apparatus of the type described wherein the area of frictional heat developed becomes smaller and smaller and dwindles to zero at one end of the weld zone so that a weakening of the strip at the end of the welding zone does not occur.

DRAWINGS

Further characteristics and advantages of the invention become apparent from the following description, the claims and the drawings in which the invention is explained in more detail on the basis of an example of execution. It is shown in:

FIG. 1 an apparatus according to the invention in a schematic, perspective representation;

FIG. 2 the object of the FIG. 1 in front view and partially in section along the line II—II of the FIG. 1;

FIG. 3 the object of the FIG. 1 in a vertical partial cross section along the line III—III; and, FIG. 4 the object of the FIG. 1 as seen in a view in the direction of the arrow IV.

PREFERRED EMBODIMENT

The apparatus designated in its entirety with 10 for the welding of plastic strips consists of a housing 50, here only indicated by a dash-dotted outline, which carries on its front edge a stationary friction jaw 15. Above this stationary friction jaw 15 a movable friction jaw 16 is located which is pivoted at one end on a shaft journal 25 in the housing so as to be swingable around a perpendicular axis. The stationary friction jaw 15 and the movable friction jaw 16 extend in longitudinal direction of the plastic strips 17 and 18 to be joined (FIGS. 2 to 4). The lower strip 18 in this setup lies in a recess 19 of the stationary friction jaw 15 whose width B is variable and can be adapted to the width of the hooped strip. In analogous manner a recess 22 is located on the bottom side of the movable friction jaw 16 in which recess lies the upper strip end 17. Also this recess 22 is variable in its width. In place of recesses on the friction jaws can also be provided with a roughening, particularly an indenticulation which impresses itself into the rim surface so that the upper strip end is taken along with the swiveling motion of the movable friction jaw.

For adjusting the width B of the recesses 19 and 20 taper gibs 51 and 52 are provided which lie against the conical lateral surfaces 53 and 54 respectively of the recess and have on their wedge surfaces a gearing with which they mesh into a corresponding gearing on the wedge-shaped lateral surfaces 53 and 54 respectively of the recesses 19 and 22 respectively. In order to prevent the taper gibs 51 and 52 from dropping out, they can be fastened in the base of the recess by pins or screws (not shown in the drawing).

As becomes apparent, particularly from the FIGS. 1 and 3, the movable friction jaw 16 has a horizontal slotted hole 30 into which enters a piston rod 36 which is pivoted in the movable friction jaw 16 by means of a journal 56 and driven at its other end 57 by an eccentric 37 which is pivoted in the housing 50 in a manner not illustrated here in any detail. By means of a compression arrangement 40 (not shown here in any detail), pressure can be exerted in the direction of the arrow P upon the movable friction jaw 16.

The mode of operation of the apparatus is the following:

In the first place, the width of the recess 19 and 22 is adjusted to the width of the two plastic strips 17 and 18 to be joined by longitudinal shifting of the taper gibs 51 and 52. Thereafter the strips 17 and 18, one lying on top of the other, are introduced into the apparatus 10 and put under stress. In this arrangement the upper strip end 17 not only can jut out beyond the front edge of the movable friction jaw 16, but it can also, depending on the desired length of the welding area, end further back. In this setup the movable friction jaw 16 lies with its entire surface on the upper strip end so that its contact surface is larger than the welded area in which the strip ends are softened on their surfaces lying one on top of the other and a fusion of the material takes place.

After the drive is switched on, the drive shaft 38 rotates and the eccentric 37 imparts a reciprocating motion to the piston rod 36. Hereby the movable friction jaw 16 is swung back and forth around its pivot 25, with pressure P being exerted at the same time upon the friction jaw 16 by means of the compression device 40. In the reciprocating motion of the movable friction jaw 16, the upper strip 17 lying in the recess 22 is taken along and moved back and forth under pressure against the strip 18 lying underneath it. Frictional heat is hereby generated decreasing over the length of the upper strip end toward the shaft journal 25, which heat melts the surfaces of the strip ends facing each other and welds them together.

In this connection it has to be pointed out that the depth t of the recesses 19 and 22 is slightly smaller than the thickness of the strip ends 17 and 18 so that with the reciprocating motion only the strip ends, not however the frictional jaws, lie on top of each other.

Since the deflection of the front edge 59 of the movable friction jaw 16 is considerably larger than at the rear edge close to the shaft journal 25, the temperature rise in the plastic strips 17 and 18 grating each other is also greater in the vicinity of the free end 59 of the movable friction jaw than in the vicinity of the shaft journal 25. In this manner, the zone of intimate fusion of the two strip ends blends gradually over into that zone where the strips lie on top of each other without fusion.

The invention is not limited to the example of execution. Thus, for instance, the friction jaws can also have a different shape and the movable friction jaw can be swiveling driven in a different manner. It is also possible to change the width of the recesses for the strips to be joined by different means without going hereby beyond the framework of the invention.

Having thus described my invention, I claim:

1. In a device for welding overlapping strips of thermoplastic material by pressure and frictional heat, said device having a pair of frictional jaws extending in longitudinal direction of the strips and means for compressing the jaws towards each other, said jaws each having means for holding said strips, the improvement which comprises; one jaw being stationary, the other jaw being swivelled at one end around an axis perpendicular to the plane of said strips, and means oscillating said movable jaw with one strip about said axis such that frictional heat is generated decreasing over the length of said one strip toward said axis.

2. The improvement of claim 1 wherein the surface of the movable friction jaw facing the one strip end is roughened, particularly provided with an indentation.

3. The improvement of claim 1 wherein the movable friction jaw overlaps laterally one strip end.

4. The improvement of claim 1 wherein the friction jaws have on their surfaces facing each other recesses adjustable in their width.

5. The improvement of claim 4 wherein the width of the recesses in the frictions jaws is adjustable by taper gibs which form a lateral edge of the recess in question and are lockable in various positions.

6. An apparatus for the welding of strips of thermoplastic material lying on top of each other by pressure and frictional heat including a pair of elongated jaws adapted to receive therebetween a pair of strip ends to be frictionally welded, the improvement which comprises: one jaw being fixed and the other jaw being pivoted at a longitudinal end around an axis perpendicular to the plane of the strips and means for swiveling the movable jaw about such axis while the jaw is in pressure engagement with the ends of the strips.

7. The improvement of claim 6 wherein each jaw has a recess of a width and depth to receive said strips.

8. The improvement of claim 7 wherein said recesses are formed by taper gibs adjustably mounted on the faces of the jaws.

9. The improvement of claim 7 wherein the surface of the movable friction jaw facing one strip is roughened.

* * * * *